Dec. 27, 1960     T. L. BAASCH     2,966,646
FLAKE THERMISTOR
Filed June 5, 1958
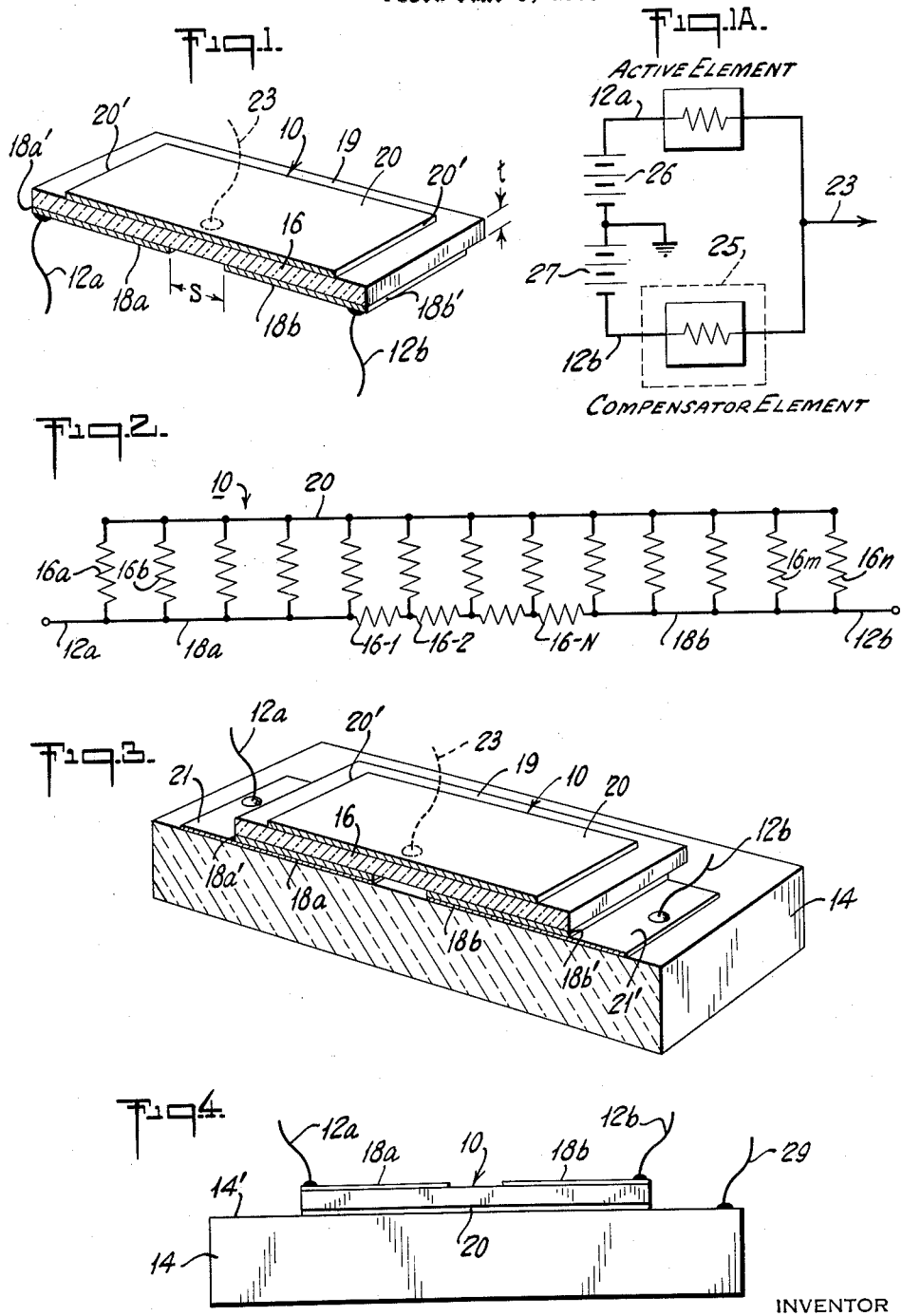
INVENTOR
*Thomas L. Baasch*
BY
*Mitchell & Bechert*
ATTORNEYS

2,966,646
FLAKE THERMISTOR

Thomas L. Baasch, Bayside, N.Y., assignor to Servo Corporation of America, New Hyde Park, N.Y., a corporation of New York Filed June 5, 1958, Ser. No. 740,114

16 Claims. (Cl. 338—22)

This invention pertains to thermistors and to thermistor bolometers.

Thermistors are solid state elements which are semiconductive. Their most useful property is thermal sensitivity. In general, the resistance of a thermistor changes with temperature changes. A thermistor used as a resistive circuit element can impart thermal control functions to the circuit by virtue of its thermal characteristics. Thus, when a thermistor is incorporated into an electrical circuit such as a resistance bridge, a convenient heat or temperature measuring device is obtained. Thermal radiation or convection from a heat source is received by the thermistor which changes resistance as the quantity of heat from the heat source changes. This change in resistance alters the balance of the bridge network which, accordingly, yields an output signal. By conventional calibration techniques, the output signal gives an indication of the temperature of the heat source.

It is necessary to bias thermistors to insure that their operating points are in the region of optimum sensitivity. Since the resistance of most thermistors is relatively high, relatively high voltages are required to obtain the desired bias.

Thermistor response to heat input has associated time constants which are attributed to thermal parameters, mainly, thermal heat capacity. It is standard practice to thermally heat-sink thermistor bolometers in order to reduce the time of response to heat input.

Any thermistor may be used as a bolometer. However, for efficient use as such, the thermistor must have a large surface-to-volume ratio; in fact, the subject invention contemplates a so-called "flake" thermistor, being a form readily suited for application as a bolometer. Thus, whenever the term "thermistor" is used herein, the application as a bolometer is inferred.

The backing, or lack of backing, of the flake-electrode thermistor combination establishes the transient and steady-state electrical characteristics of the unit. Although flake-thermistor bolometers function extremely well, they impose some restrictions on their associated circuitry. Their resistance is high, usually in the order of megohms. Therefore, the output of the bridge network must be sensed by a very high impedance detector. Preamplifier vacuum tubes are usually used to change the resistance level. However, known thermistor bolometers are unsuited for coupling to low-impedance amplifying devices such as solid state transistors or magnetic amplifiers.

The resistance of a thermistor or thermistor bolometer is relative, being dependent upon the total heat content or temperature of the element. The sensitivity of thermistor material is enhanced at low temperatures but conventional thermistors or thermistor bolometers have extremely high impedances at low temperatures, making coupling extremely difficult.

Known thermistors have relatively long time constants with about one second as the lower limit. The time constant of known devices of the bead, rod and disc types are limited by their geometry and technique of manufacture.

The time constants of known thermistor bolometers are limited by their physical structure and the necessity for insulating them from their thermal heat sink. Known insulating materials have relatively low thermal conductivity.

Thermistor bolometers are usually incorporated as matched pairs in a bridge circuit. One of the matched-pair thermistors is used to sense short-time heat input. The other of the pair serves to compensate for long-term changes in ambient temperature.

It is, accordingly, an object of the invention to provide an improved thermistor and, in particular, an improved thermistor bolometer.

It is another object of the invention to provide a highly sensitive bolometer of the thermistor type which may be used with lower-impedance detection circuits.

It is a further object of the invention to provide a thermistor or sensitive thermistor bolometer which operates extremely well with lower operating bias.

It is a still further object of the invention to provide a thermistor bolometer which has a relatively low internal resistance.

It is also an object of this invention to permit the achievement of a shorter time constant in a thermistor or thermistor-bolometer construction, as well as to provide a structure inherently suited to greater control of this delay.

It is a specific object to achieve the above objects in a thermistor or thermistor bolometer employing conventional thermistor-flake material and involving conventional flake-processing techniques.

Another specific object of this invention is to achieve improved performance of special or conventional flake material at low temperature, using conventional circuits.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Fig. 1 is an enlarged perspective view of a thermistor or bolometer in accordance with the invention;

Fig. 1A is an electrical circuit diagram illustrating an employment of the thermistor or bolometer of Fig. 1.

Fig. 2 is an idealized schematic diagram to illustrate the internal resistances of the bolometer of Fig. 1;

Fig. 3 is a view similar to Fig. 1 illustrating a modification; and

Fig. 4 is a view in elevation of a further modification.

Briefly, in accordance with the invention, a thermistor or bolometer element is provided which comprises a sheet or "flake" of a thermally sensitive resistance material, i.e., a material which changes its electrical resistance with changes in internal heat energy. Relatively low-resistance characteristics of the element at normal temperatures are determined by a particular employment of electrode connections to the flake. Two electrically conductive elements are fixed in spaced relation on one face of the sheet "flake," for connection to an electrical circuit (e.g. a resistance-bridge circuit). Another electrically conductive element is fixed on the other face of the sheet, to provide a shunt-resistance path between the pair of electrically conductive elements.

In particular, Fig. 1 shows a thermistor 10 having leads 12($a$–$b$) for coupling to an electrical circuit. The thermistor 10 may be employed as a circuit element, or it may be mounted as a so-called air-backed bolometer, or it may be bonded to a heat sink, the latter form being specifically disclosed at 14 in Fig. 3. When used as a bolometer, heat from a source (not shown) falls on the top face of the bolometer 10, is absorbed by the flake body 16, and is drawn off by the air on the other face or by the heat sink 14, as the case may be. As the absorbed radiation varies, the electrical resistance between the leads 12($a$–$b$) via the bolometer varies in an inversely proportional relationship. Measurement of this resistance gives an indication of the temperature of the heat source.

The flake 16 may be of the thermistor variety, comprising a thermally sensitive resistance material composed of, for example, oxides of manganese, nickel and cobalt. By suitable processing, including sintering, mixtures of these oxides form a stable structure having a negative temperature coefficient of resistance.

Upon one face of the flake 16 are coated a pair of spaced electrically conductive elements 18($a$–$b$), to which the leads 12($a$–$b$) are respectively connected. An electrically conductive element 20 of a material such as aquadag, or an evaporated, sputtered or fired-on metal, such as platinum, gold, etc., is applied to the other face of the sheet 16. When used as a bolometer, the surface of the electrically conductive element 20 (18($a$–$b$) in Fig. 4) remote from the sheet 16 is further coated with a good heat-absorbing material, such as Zapon, gold black, or platinum black. The electrode area 20 is substantially coextensive with the combined areas of electrodes 18$a$–18$b$; however, I prefer that the outer limits 18$a'$–18$b'$ of electrodes 18$a$–18$b$ shall extend beyond the corresponding outer limits 20' of the large electrode 20, the leads 12($a$–$b$) being attached at the projecting end areas 18$a'$–18$b'$ so as not to interfere with the sensitive area of the thermistor. A border 19 of thermistor material may extend outside the "coextensive" conductive areas 18$a$–18$b$–19 to act as an electrical creepage margin.

As shown in Fig. 3, the bolometer 10 is fixed to the heat sink 14. If the heat sink is of glass, then there can be a direct fusing of the two members; when the heat sink is of quartz or sapphire, an intermediate sealing glass of suitably matching character is employed. When a metal heat sink 14 is employed, then it is necessary to employ glass, plastic cement, or a similar non-conductive material as a bonding agent and electrical insulator, but the bonding thickness should be small in order to promote rapid thermal dissipation to the sink 14. In order to attach leads 12($a$–$b$) in Fig. 3, I show provision of localized conductive areas 21—21' applied to heat sink 14 and coextensive with electrodes 18($a$–$b$); areas 21—21' project beyond the outer limits of the flake 10 to permit lead attachment, as shown. Direct electrically conductive fusion of the flake to the metal sink 14 may be employed as in Fig. 4, but this structure is prohibitive in Fig. 3.

In general, most flake-type thermistors only have a pair of electrodes similar to the electrically conductive elements 18($a$–$b$), mounted on the upper surface (i.e. surface remote from the heat sink). The resistance between these electrodes is dependent on current paths in the thermally sensitive resistance material. Since the resistance is directly related to the length of the current paths, the resistance is related to the separation between the electrodes. There is a practical limit on the minimum separation of the electrodes. Unfortunately, at this limit, the resistance still has a very large value, and the flake area is small.

However, when an additional electrode such as the electrically conductive element 20 is incorporated in the structure, an additional shunt path is provided. The shunt path can be made a very low resistance path. For example, in the thermistor 10, the thickness $t$ of the sheet is in the order of 10 microns, while the separation S between the electrically conductive elements 18($a$–$b$) may be in the order of 200 microns or more, depending on desired resistance characteristics. Thus, assuming a fixed resistance per unit path length, the resistance between the electrodes 18($a$–$b$) via the path formed by the idealized resistance elements 16–I to 16–N (Fig. 2) is ten times greater than the resistance via the path which includes the resistance element 16$a$, the electrically conductive element 20 and the resistance element 16$n$, thus determining an immediate ten-fold decrease in resistance between electrodes 18$a$–18$b$, as compared with the situation if electrode 20 were not provided. The actual decrease in resistance is much greater since there are in fact a great number of similar shunt paths each including the conductive element 20.

Figs. 1 and 3 also serve to illustrate forms of the invention wherein the thermistor 10 forms two legs of a bridge circuit, additional lead connection being made at 23 to the large electrode 20. The connection 23 is preferably located opposite the space between electrodes 18($a$–$b$), so as to avoid any possible interference with sensitive areas of the flake. Fig. 1A illustrates a typical circuit employment of such 3-lead thermistors, and the lead connections are labeled with reference characters already identified. In the bridge of Fig. 1A, one of the sensitive areas (overlap between electrodes 18$a$–20) is employed as the "active" thermistor bolometer element, and the other sensitive area (overlap between electrodes 18$b$–20) is employed as the "compensator" thermistor bolometer element, shielding of the "compensator" being suggested at 25. The two elements are formed on the same flake 16, and are oppositely polarized by biasing sources 26—27, balanced with respect to ground, so that the output signal reflecting radiation incident on the active element is available at lead 23.

In the form of Fig. 4, the described electroded flake 16 is mounted "upside-down" on the heat sink 14, that is upside-down in relation to Fig. 3. This permits the employment of a metal heat sink 14 (or of a heat sink 14 having at least a conductive upper or mounting surface 14'), so that the large electrode 20 may be directly and conductively bonded to the surface 14'. For a 3-lead bolometer employment, the output or signal-lead connection 29 is shown as being made directly to the heat sink.

In any of the 3-lead bolometer embodiments of the invention, it will be appreciated that the spacing S between sensitive areas of the same flake 16 will in most instances be dictated by the shielding requirements for the "compensator" area. In other words, to accomplish effective shielding, the spacing S may have to be very large compared to the length or the width of the sensitive areas. Nevertheless, the construction affords great advantages because the common flake 16 for both sensitive areas means a theoretically perfect electrical match of sensitive element characteristics. Also, the time for "warm up" to a given operating condition (ambient) is substantially reduced because the same flake serves both elements and the thermal conductivity of the long electrode 20 serves to equalize the temperature of the active and "compensator" elements almost immediately after thermal radiation is removed from the irradiated active area.

There have thus been shown thermistors or thermistor bolometers which have shunt-resistance paths permitting a great decrease in inherent resistance. This lowering of the characteristic resistance permits the use of lower impedance detection circuits and relaxes the requirements on high operating biases. Also, by variously spacing electrodes 18$a$–18$b$ and the extent of overlap of electrode 20 therewith (as well as by a variation in the thickness of flake 16 or by variation in the specific resistance of the thermistor material), a range of possible design resistances is available for a given flake. Furthermore, the lower resistance elements are less sensitive to internally or externally generated noise.

With regard to the 3-lead bolometers, it will be seen that I have provided biased bolometers capable of rapidly measuring radiation intensity by means of direct-coupled circuitry with a reproducible zero. The bolometer is inherently frequency-compensated and the heat sink is not relied upon to promote compensation, as is the case with previous bolometers. The transient and steady-state performance of my bolometers is substantially improved by my large electrode 20, "coextensive" with the other electrodes 18(a–b).

While the invention has been described in detail in connection with the preferred form illustrated, it will be understood that modifications may be made within the scope of the invention as defined in the claims which follow.

I claim:

1. A thermistor, comprising a single sheet of temperature sensitive resistance material, first and second spaced electrical conductive elements on one face of said sheet for connection to an electrical circuit, and an electrical conductive element on the other face of said sheet in overlapping relation with at least parts of both said first and second elements.

2. A thermistor according to claim 1, and including separate lead connections to all three of said conductive elements.

3. A thermistor, comprising a single sheet of temperature sensitive resistance material, first and second electrical conductive elements fixed in spaced relationship to each other on one face of said sheet for connection to an electrical circuit, whereby said sheet provides a first electrical conduction path between said first and second electrical conductive elements, and a third electrical conductive element fixed to the other face of said sheet in overlapping relation with at least parts of said first and second elements, whereby said third electrical conductive element cooperates with portions of said sheet to provide a second electrical conduction path in shunt with said first path.

4. A bolometer, comprising a single sheet of temperature sensitive resistance material, first electrode means comprising first and second electrical conductive elements on a first face of said sheet for connection to an electrical circuit, said first and second conductive elements being separated by a distance very much greater than the thickness of said sheet, second electrode means comprising a third conductive element on the other face of said sheet, said third conductive element cooperating with said sheet of temperature sensitive material to provide an electrical path between said first and second conductive elements, and a heat sink bonded to said sheet at one of said electrode means.

5. The bolometer of claim 4, wherein the projection of said third conductive element onto said first face includes portions of said first and second conductive elements.

6. The bolometer of claim 4, wherein said third conductive element is substantially coextensive with the entire surface of the second face of said sheet.

7. The bolometer of claim 4, wherein said first face is divided into three regions: a first region being coated with an electrically conductive material to form a portion of said first electrical conductive element, a second region being coated with an electrically conductive material to form a portion of said second electrical conductive element, and a third region interposed between said first and second regions.

8. The bolometer of claim 4, wherein the thickness of said sheet is in the order of tens of microns.

9. The bolometer of claim 4, wherein the separation between said first and second conductive elements on the first face of said sheet is in the order of hundreds of microns.

10. The bolometer of claim 4, wherein the thickness of said sheet is in the order of ten microns, and the separation between said first and second conductive elements on the first face of said sheet is in the order of two hundred microns.

11. The bolometer of claim 4, wherein said first face is operatively disposed with respect to said heat sink.

12. The bolometer of claim 4, wherein said second face is operatively disposed with respect to said heat sink.

13. A thermistor, comprising a flake of a temperature sensitive resistance material, first and second electrical conductive elements fixed to one face of said flake for connection to an electrical circuit, said first and second elements being separated from each other by a distance very much greater than the thickness of said flake, and a third electrical conductive element fixed to the other face of said flake, said third electrical conductive element comprising a first part overlapping a portion of said first element and a second part overlapping a portion of said second element, thereby providing an electrical conduction path between said first and second electrical conductive elements in parallel with an electrical conduction path provided solely by the portion of the flake between said first and second conductive elements.

14. The thermistor of claim 13 wherein the thickness of said flake is less than one tenth of the spacing between said first and second electrical conductive elements.

15. A bolometer, comprising a flake of thermistor material, spaced first and second electrically conductive elements on one face of said flake, a third electrically conductive element on the other face of said flake in overlapping relation with at least parts of both said first and second elements, said first and second elements including portions projecting beyond overlap with said third conductive element, and separate lead connections to said projecting portions.

16. The bolometer of claim 15, and including a further separate lead connection to said third conductive element at the region opposite the space between said first two elements.

References Cited in the file of this patent

UNITED STATES PATENTS

| | | |
|---|---|---|
| 2,414,792 | Becker | Jan. 28, 1947 |
| 2,516,672 | Brockman | July 25, 1950 |
| 2,553,420 | McFee | May 15, 1951 |
| 2,678,401 | Jaeger | May 11, 1954 |